United States Patent
Gaab et al.

(10) Patent No.: US 10,785,830 B2
(45) Date of Patent: Sep. 22, 2020

(54) INFRARED EMITTER

(71) Applicants: Heraeus Noblelight GmbH, Hanau (DE); Heraeus Quarzglas GmbH & Co. KG, Hanau (DE)

(72) Inventors: Lotta Gaab, Darmstadt (DE); Nils Christian Nielsen, Schlangenbad (DE); Gerrit Scheich, Seligenstadt (DE); Jürgen Weber, Kleinostheim (DE); Frank Wessely, Dieburg (DE)

(73) Assignees: Heraeus Noblelight GmbH, Hanau (DE); Heraeus Quarzglas GmbH & Co. KG, Hanau (DE)

( * ) Notice: Subject to any disclaimer, the term of this patent is extended or adjusted under 35 U.S.C. 154(b) by 170 days.

(21) Appl. No.: 15/775,947

(22) PCT Filed: Nov. 11, 2016

(86) PCT No.: PCT/EP2016/077455
§ 371 (c)(1),
(2) Date: May 14, 2018

(87) PCT Pub. No.: WO2017/084980
PCT Pub. Date: May 26, 2017

(65) Prior Publication Data
US 2018/0332665 A1     Nov. 15, 2018

(30) Foreign Application Priority Data
Nov. 16, 2015   (DE) .................. 10 2015 119 763

(51) Int. Cl.
*H05B 3/00*   (2006.01)
*H05B 3/26*   (2006.01)
(Continued)

(52) U.S. Cl.
CPC ............. *H05B 3/009* (2013.01); *F27B 9/063* (2013.01); *F27D 11/00* (2013.01); *H05B 3/0038* (2013.01);
(Continued)

(58) Field of Classification Search
None
See application file for complete search history.

(56) References Cited

U.S. PATENT DOCUMENTS

| | | | |
|---|---|---|---|
| 3,978,316 A * | 8/1976 | Rose .................. | H05B 3/265 219/543 |
| 4,245,613 A | 1/1981 | Wells et al. | |

(Continued)

FOREIGN PATENT DOCUMENTS

| | | |
|---|---|---|
| DE | 102011012363 | 8/2012 |
| EP | 0495770 | 7/1992 |

(Continued)

OTHER PUBLICATIONS

Manara et al., "Determining the Transmittance and Emittance of Transparent and Semitransparent Materials at Elevated Temperatures", 5th European Thermal-Sciences Conference, The Netherlands, 2008.

(Continued)

*Primary Examiner* — Thor S Campbell
(74) *Attorney, Agent, or Firm* — Stradley Ronon Stevens & Young, LLP (57) ABSTRACT

An infrared emitter is provided. The infrared emitter includes a substrate made of an electrically insulating material. The substrate includes a surface that contacts a printed conductor made of a resistor material that is electrically conducting and generates heat when current flows through it. The electrically insulating material includes an amorphous matrix component into which an additional compo- (Continued)

nent is embedded that absorbs in the spectral range of infrared radiation. At least a part of the surface is configured with a cover layer made of porous glass, whereby the printed conductor is embedded, at least in part, in the cover layer.

20 Claims, 4 Drawing Sheets (51) Int. Cl.
*F27D 11/00* (2006.01)
*F27B 9/06* (2006.01)
*H05B 3/66* (2006.01)
(52) U.S. Cl.
CPC ............ *H05B 3/265* (2013.01); *H05B 3/66* (2013.01); *H05B 2203/002* (2013.01); *H05B 2203/013* (2013.01); *H05B 2203/032* (2013.01)

(56) References Cited

U.S. PATENT DOCUMENTS

| | | | | |
|---|---|---|---|---|
| 4,357,526 A * | 11/1982 | Yamamoto | ............... | F23Q 7/001 123/145 A |
| 4,534,820 A * | 8/1985 | Mori | .............. | C30B 11/12 117/58 |
| 4,733,056 A * | 3/1988 | Kojima | ............... | H05B 3/283 219/270 |
| 4,806,739 A * | 2/1989 | Kojima | ............... | H05B 3/283 219/543 |
| 4,833,301 A | 5/1989 | Furtek | | |
| 5,304,784 A * | 4/1994 | Tagashira | .......... | G03G 15/2003 219/543 |
| 5,643,483 A | 7/1997 | Kubota et al. | | |
| 5,668,072 A * | 9/1997 | Holcombe, Jr. | ........ | C04B 28/34 106/14.05 |
| 5,693,244 A * | 12/1997 | Pragt | ................ | A47J 27/21066 219/429 |
| 5,753,893 A * | 5/1998 | Noda | .................. | C04B 35/111 219/548 |
| 5,911,896 A * | 6/1999 | Holden | ............. | H01L 21/67109 118/725 |
| 6,037,574 A * | 3/2000 | Lanham | .................. | H05B 3/28 219/390 |
| 6,118,109 A | 9/2000 | Sako | | |
| 6,222,166 B1 * | 4/2001 | Lin | ....................... | H05B 3/262 219/538 |
| 6,768,256 B1 * | 7/2004 | Fleming | ................ | B82Y 20/00 313/271 |
| 6,791,069 B2 * | 9/2004 | Sako | .................. | G03G 15/2064 219/543 |
| D601,521 S * | 10/2009 | Komatsu | ..................... | D13/182 |
| 8,395,091 B2 * | 3/2013 | Maurin-Perrier | ...... | H01C 7/006 219/260 |
| 9,126,271 B2 * | 9/2015 | Li | ............................ | B26D 7/00 |
| 10,301,992 B2 * | 5/2019 | Takase | ................ | B01D 53/944 |
| 2003/0156831 A1 * | 8/2003 | Schaeffer | ................ | A61N 5/06 392/416 |
| 2004/0190882 A1 | 9/2004 | Cooper | | |
| 2005/0002659 A1 * | 1/2005 | Panaghe | ................ | H05B 3/283 392/435 |
| 2010/0017953 A1 * | 1/2010 | O'Keeffe | ............... | G16H 20/40 4/524 |
| 2010/0065543 A1 * | 3/2010 | Dubey | ..................... | H05B 3/34 219/213 |
| 2013/0319998 A1 * | 12/2013 | Benda | .................. | A61H 33/063 219/553 |
| 2014/0215708 A1 * | 8/2014 | Benda | .................. | A61H 33/063 4/524 |
| 2015/0132511 A1 | 5/2015 | Scheich et al. | | |
| 2015/0382405 A1 * | 12/2015 | Benda | ....................... | H05B 3/16 219/477 |
| 2016/0021704 A1 * | 1/2016 | Elverud | ................. | H05B 3/145 219/549 |
| 2018/0056388 A1 * | 3/2018 | Skszek | ..................... | B22F 3/105 |
| 2018/0077756 A1 * | 3/2018 | Linow | .................... | H05B 3/009 |
| 2018/0120158 A1 * | 5/2018 | Blomberg | ............... | G01J 3/108 |
| 2018/0146512 A1 * | 5/2018 | Pindl | ........................ | G01N 21/1702 |
| 2019/0372449 A1 * | 12/2019 | Mills | ........................ | G21B 3/00 |

FOREIGN PATENT DOCUMENTS

| | | |
|---|---|---|
| EP | 1185144 | 3/2002 |
| JP | 2000012191 | 4/2000 |
| JP | 2000173750 | 6/2000 |
| JP | 2001326060 | 11/2001 |
| JP | 2006332068 | 12/2006 |
| WO | 1999025154 | 5/1999 |
| WO | 2006021416 | 3/2006 |
| WO | 2015067688 | 5/2015 |

OTHER PUBLICATIONS

International Search Report for International Patent Application No. PCT/EP2016/077455 dated Jan. 18, 2017.
Office Action dated Jul. 25, 2019 in corresponding Japanese Patent Application No. 2018-544410.
Office Action dated Sep. 23, 2019 in corresponding Korean Patent Application No. 10-2018-7014996.
Office Action dated Apr. 30, 2020 in corresponding Japanese Patent Application No. 2018-544410.

* cited by examiner

INFRARED EMITTER

CROSS REFERENCE TO RELATED APPLICATIONS

This application is a U.S. National Phase filing of international patent application number PCT/EP2016/077455 filed Nov. 11, 2016 that claims the priority of German patent application number 102015119763.4 filed Nov. 16, 2015. The disclosures of these applications are hereby incorporated by reference in their entirety.

FIELD

The invention relates to an infrared emitter, in particular a panel infrared emitter, having a substrate made of an electrically insulating material that including a surface that contacts a printed conductor made of a resistor material that is electrically conducting and generates heat when current flows through it.

BACKGROUND

It is common to use tube-shaped infrared lamps in panel infrared emitters, in which a coil-shaped resistor wire is surrounded by a cladding tube made of quartz glass, while keeping a distance from and having essentially no contact with the tube. For example, in the panel IR emitter known from DE 10 2011 012 363 A1, a multitude of individual infrared lamps are combined into a spatial lamp arrangement whose geometry is adapted to that of the heating goods. In this context, the infrared lamps are embedded, on the back, in a mass made of opaque quartz glass that works as a diffuse reflector. The ensemble of reflecting quartz glass mass and panel IR lamp arrangement forms an assembly, in which the quartz glass serves both as joining mass for fixation of the lamp tubes to each other and also as reflector.

In this embodiment of the panel IR emitter, both the transmission of heat from the resistor wire through which the current flows to the quartz glass lamp tube as well as the heat transmission to the heating goods proceed virtually exclusively by means of radiation with convection and heat conduction playing only a minor role. One basic issue in this context is how to emit the available radiation power towards the heating goods as effectively as possible (at high power efficiency) and, simultaneously, at high homogeneity. The distance between the heating goods and the individual infrared lamps of the panel emitter plays an important role in this context. An empirical rule of thumb says that the minimal distance required for homogeneous irradiation corresponds to approximately 1.5-fold the center distance of the individual infrared lamps. Accordingly, a low distance between the individual infrared lamps and a large distance between panel emitter and heating goods is favorable for homogeneous radiation. The former alternative (narrow lamp-lamp-emitter distance) is subject to physical and technological limits and is associated with higher fabrication costs for the panel emitter. The latter alternative (large infrared emitter-heating goods distance) leads to a lower degree of efficiency of the irradiation power used in this process and comparably lower radiation power per unit area of heating surface.

A certain improvement in terms of the degree of efficiency of the transmission results from the panel infrared emitter known from WO1999/025154 A1, in which a spatial, planar, tube-shaped or polyhedral substrate made of quartz glass that is in direct and continuous contact with an electrical resistor element is used. The resistor element has, for example, a meandering shape and is applied by means of film, screen printing or thin layer printing technique to the substrate heating surface, and is then burned in.

A heating facility for wafers is known from U.S. Pat. No. 5,643,483 A, in which the substrate is a rectangular plate consisting of synthetically produced quartz glass. The underside of the substrate plate facing away from the wafer is sand-blasted and a printed conductor is applied to the thus roughened surface in the form of a double spiral by means of screen printing of a platinum-silver paste.

In the two latter embodiments, the heating element does not heat a surrounding cladding tube, but it directly heats, through direct and spatially extending contact in the form of the printed conductor, the quartz glass substrate such that the heat transmission between the heating element and the substrate proceeds mainly by heat conduction and convection, which can have a positive effect on the power efficiency.

Quartz glass possesses good corrosion, temperature, and temperature cycling resistance and is available at high purity. Accordingly, it is also well-suited for high-temperature heating processes with stringent requirements concerning the purity and inertness as the substrate material for a panel infrared emitter. However, as a matter of rule, quartz glass shows comparably low thermal conductivity and is even commonly used as a heat insulator. Therefore, if the substrate walls are thin, there is a risk of inhomogeneous heat distribution, which, in an extreme case, can show up on the opposite substrate side as a pattern reflecting the shape of the electrical resistor element. This can be counteracted only by a high occupation density of a printed conductor, though this is expensive. If the substrate walls are thick, the power efficiency and the response time suffer (this means rapid temperature changes are not possible as these require rapid heating and cooling of the substrate).

A certain improvement in terms of the response time results from another panel infrared emitter with a two-dimensional substrate made of aluminium nitride ceramics as is known, for example, from EP 1 185 144 A1. Aluminium nitride (AlN) shows a thermal conductivity of at least 180 $Wm^{-1}K^{-1}$, which is very high for ceramic materials, but it is sensitive to water-containing environments at high temperatures. Moreover, the substance is brittle and difficult to adapt to multi-dimensional geometries of heating surfaces, which is a disadvantage the material shares with other known crystalline substrate materials for heating elements such as, for example, the ceramic and electrically non-conducting materials, boron nitride or aluminium oxide.

SUMMARY

According to an exemplary embodiment of the invention, an infrared emitter is provided. The infrared emitter includes a substrate made of an electrically insulating material. The substrate includes a surface that contacts a printed conductor made of a resistor material that is electrically conducting and generates heat when current flows through it. The electrically insulating material includes an amorphous matrix component into which an additional component is embedded that absorbs in the spectral range of infrared radiation. At least a part of the surface is configured with a cover layer made of porous glass, whereby the printed conductor is embedded, at least in part, in the cover layer.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

Infrared emitters are often equipped with an electrical resistor element made of a resistor material that generates heat when current flows through it. In certain embodiments, the electrical resistor element itself forms the actual heating element of the infrared emitter. In exemplary embodiments of the invention, the resistor element (e.g., a wire, a web or a layer made of the resistor material) serves to heat another component, which shall be called "substrate" hereinafter. The heat transport from the electrical resistor element to the substrate can be based on heat conduction, convection and/or heat radiation.

Infrared emitters show point- or line-shaped emission characteristics for the infrared radiation or, as spacial infrared emitters, they show two- or three-dimensional emission characteristics that are adapted to the geometry of the surface of the heating goods to be heated and enables homogeneous irradiation of two- or three-dimensional surfaces.

In accordance with certain exemplary embodiments of the invention, panel infrared emitters are provided including a substrate that includes a surface, and is made of an electrically insulating material. The electrically insulating material contacts a printed conductor made of a resistor material that is electrically conductive and generates heat when current flows through it. To provide, on this basis, an infrared emitter, in particular a panel infrared emitter with high radiation power per unit area that is easy to adapt to the geometry of the surface to be heated and allows for homogeneous heating even if the substrate walls are thin, the invention proposes the substrate material to include an amorphous matrix component into which an additional component is embedded that absorbs in the spectral range of infrared radiation.

Aspects of the invention relate to an infrared emitter, for example a panel infrared emitter, with high radiation power per unit area that can easily be adapted to the geometry of the surface to be heated and allows for homogeneous heating even if the substrate walls are thin.

Exemplary infrared emitters according to the invention include a substrate material including an amorphous matrix component into which an additional component is embedded that absorbs in the spectral range of infrared radiation.

In exemplary infrared emitters according to the invention, the substrate is the actual element emitting IR radiation. The substrate material may contain, for example, the following components: (i) the matrix component; and (ii) the additional component.

The matrix component accounts for the largest fraction of the substrate material in terms of weight and volume. The matrix component is decisive for the mechanical and chemical properties of the substrate, for example, the temperature resistance, the strength, and the corrosion properties. Since the matrix component is amorphous—it consists, for example, of glass or plastics—the geometrical shape of the substrate can be adapted more easily than crystalline materials to the requirements during specific application of the infrared emitter.

The additional component is distributed uniformly or specifically non-uniformly in the matrix component. The additional component is decisive for the optical and thermal properties of the substrate; to be more specific, it effects an absorption in the infrared spectral range, which is the wavelength range between 780 nm and 1 mm. The additional component shows an absorption that is higher than that of the matrix component for at least part of the radiation in this spectral range.

The areas of the additional component phase in the matrix component act as optical defects and can cause, for example, the composite material to look black or grey-blackish by eye at room temperature, depending on the thickness of the layer. Moreover, the defects also have a heat-absorbing effect.

According to Kirchhoff's law of thermal radiation, the absorptivity c and the emissivity $\varepsilon_\lambda$ of a real body in thermal equilibrium are equal.

$$\alpha_\lambda = \varepsilon_\lambda \tag{1}$$

Accordingly, the additional component leads to the emission of infrared radiation by the substrate material. The emissivity $\varepsilon_x$ can be calculated as follows if the spectral hemispherical reflectance $R_{gh}$ and transmittance $T_{gh}$ are known:

$$\varepsilon_\lambda = 1 - R_{gh} - T_{gh} \tag{2}$$

In this context, the "emissivity" shall be understood to be the "spectral normal degree of emission". Same is determined by means of a measuring principle that is known by the name of "Black-Body Boundary Conditions" (BBC) and published in DETERMINING THE TRANSMITTANCE AND EMITTANCE OF TRANSPARENT AND SEMI-TRANSPARENT MATERIALS AT ELEVATED TEMPERATURES; J. Manara, M. Keller, D. Kraus, M. Arduini-Schuster; 5th European Thermal-Sciences Conference, The Netherlands (2008).

The substrate material with the additional component has a higher absorption of heat radiation than would be the case in the absence of the additional component. This results in an improved thermal conductivity from the current path into the substrate, more rapid distribution of the heat, and a higher rate of emission towards the heating goods. By this means, it is feasible to provide higher irradiation power per unit area and to generate a homogeneous emission and uniform temperature field even for thin substrate walls and/or a comparably low printed conductor occupation density. Thin substrates have a low thermal mass and permit rapid temperature changes. Cooling is not required for this purpose.

Since the substrate consists of an amorphous material, it can easily be shaped suitably for the specific application. It is designed, for example, as a plate, ring, massive cylinder or hollow cylinder, but can just as well be part of furnace walls or reactors.

The additional component is embedded into the matrix component. It forms an inherent amorphous or crystalline phase that is dispersed in the amorphous matrix component.

According to certain exemplary embodiments of the invention, the type and amount of the additional component present in the substrate material are preferably appropriate such as to effect, in the substrate material at 600° C., an emissivity ε of at least 0.6 for wavelengths between 2 and 8 μm.

In a particularly preferred embodiment of the infrared emitter according to the invention, the type and amount of the additional component present are such as to effect, in the substrate material at a temperature of 1000° C., an emissivity ε of at least 0.75 for wavelengths between 2 and 8 μm.

Accordingly, the substrate material has high absorption and emission power for heat radiation between 2 μm and 8 μm, i.e. in the wavelength range of infrared radiation. This reduces the reflection at the substrate surfaces such that, on the assumption of the transmission being negligibly small, the resulting degree of reflection for wavelengths between 2 and 8 μm and at temperatures above 1000° is maximally 0.25 and at temperatures above 600° C. is maximally 0.4. Non-reproducible heating by reflected heat radiation is thus prevented which contributes to a uniform or desired non-uniform temperature distribution.

The matrix can consist of undoped or doped quartz glass and, if applicable, can contain oxidic, nitridic or carbidic components other than $SiO_2$ in an amount of maximally 10% by weight. In order to prevent a risk of contamination arising from the substrate material, an embodiment of the infrared emitter, in which the amorphous matrix component is quartz glass and preferably has a chemical purity of at least 99.99% $SiO_2$ and a cristobalite content of no more than 1% has proven to be particularly expedient.

Quartz glass possesses the aforementioned advantages of good corrosion, temperature, and temperature cycling resistance and is always available at high purity. It is therefore a possible substrate material even in high-temperature heating processes with temperatures of up to 1100° C. Cooling is not required.

The cristobalite content of the matrix being low, i.e. 1% or less, ensures that the devitrification tendency is low and, therefore, that the risk of crack formation during use is low. As a result, even the strict requirements concerning the absence of particles, purity, and inertness that are often evident in semiconductor fabrication processes are met.

The heat absorption of the substrate material depends on the fraction of the additional component. The weight fraction of the additional component should therefore preferably be at least 0.1%. On the other hand, if the volume fraction of the additional component is high, this can have an adverse effect on the chemical and mechanical properties of the matrix. Taking this into consideration, according to certain exemplary embodiments of the invention, the weight fraction of the additional component is preferably in the range of 0.1 to 5%.

Particularly high emissivity can be attained if the additional component is present as an additional component phase and has a non-spherical morphology with maximal mean dimensions of less than 20 μm, but preferably of more than 3 μm.

In this context, the non-spherical morphology of the additional component phase also contributes to high mechanical strength and to a low tendency of crack formation of the substrate material. The term "maximal dimension" shall refer to the longest extension of an isolated area of the additional component phase as visible in a microphotograph. The mean mentioned above is the median of all longest extensions in a microphotograph.

In a preferred embodiment of the infrared emitter, the additional component contains a semiconducting material in elemental form, preferably silicon in elemental form.

The fine-particle areas of the semiconducting phase in the matrix act as optical defects and can cause, for example, the substrate material to look black or grey-blackish by eye at room temperature, depending on the thickness of the layer. On the other hand, the defects also have an impact on the overall heat absorption of the substrate material. This is mainly due to the properties of the fine-distributed phases of the semiconductor that is present in elemental form, to the effect that, on the one hand, the energy between valence band and conduction band (bandgap energy) decreases with the temperature and, on the other hand, electrons are elevated from the valence band to the conduction band if the activation energy is sufficiently high, which is associated with a clear increase in the absorption coefficient. The thermally activated occupation of the conduction band leads to the semiconducting material being transparent to a certain degree at room temperature for certain wavelengths (such as from 1000 nm) and becoming opaque at high temperatures. Accordingly, the absorption and emissivity can increase abruptly with increasing temperature of the substrate material. This effect depends, inter alia, on the structure (amorphous/crystalline) and doping of the semiconducting material. For example, pure silicon shows a notable increase in emission from approximately 600° C., reaching saturation from approximately 1000° C.

The semiconducting material, and specifically the preferably used silicon in elemental form, therefore have the effect to make the vitreous matrix material black and to do so at room temperature, but also at elevated temperatures above, for example, 600° C. As a result, good irradiation characteristics in terms of a high broadband emission at high temperatures is attained. In this context, the semiconducting material, preferably the silicon in elemental form, forms its own Si phase that is dispersed in the matrix. This phase can contain multiple metalloids or metals (but metals only up to 50% by weight, better no more than 20% by weight; relative to the weight fraction of the additional component). In this context, the substrate material shows no open porosity, but no more than closed porosity of less than 0.5% and has a specific density of at least 2.19 g/cm³. It is therefore well-suited for infrared emitters, with regard to which purity or gas tightness of the substrate material are important.

Components made of a composite material with a matrix made of quartz glass and having a silicon phase embedded in it are known. According to WO 2015067688 A1, these are used to fabricate, for example, reactors, fittings or wafer holders for use in an oxidation or annealing process, epitaxy or chemical gas phase deposition. For use as infrared radiation-emitting material for an infrared emitter according to exemplary embodiments of the invention, the substrate is configured with a printed conductor, which preferably is provided in the form of a burned-in thick film layer.

The thick film layers are generated, for example, from resistor paste by means of screen printing or from metal-containing ink by means of inkjet printing, and are subsequently burned-in at high temperature.

With regard to a temperature distribution being as homogeneous as possible, it has proven to be advantageous to provide the printed conductor as a line pattern covering a surface of the substrate such that an intervening space of at least 1 mm, preferably at least 2 mm, remains between neighbouring sections of printed conductor.

The absorption capacity of the substrate material being high enables homogeneous emission even if the printed conductor occupation density of the heating surface is comparably low. A low occupation density is characterised in that the minimal distance between neighbouring sections of printed conductor is 1 mm or more, preferably 2 mm or more. The distance between sections of printed conductor being large prevents flashover, which can occur, in particular, upon operation at high voltages in a vacuum. The infrared emitter according to the invention is therefore particularly well-suited for vacuum operation. The printed conductor extends, for example, in a spiral-shaped or meandering line pattern.

A particularly advantageous embodiment of the infrared emitter according to the invention is characterised in that the substrate includes a surface facing the printed conductor and in that at least a part of the surface is configured with a cover layer made of porous quartz glass, whereby the printed conductor is embedded, at least in part, in the cover layer.

In this context, the cover layer made of opaque quartz glass serves as a diffuse reflector and concurrently protects and stabilises the printed conductor. The effect and the production of a cover layer of this type made of opaque quartz glass are known and are described, for example, in WO 2006/021416 A1. It is generated from a dispersion containing amorphous $SiO_2$ particles in a liquid. This is applied to the substrate surface facing the printed conductor, dried to form a green layer, and the green layer is sintered at high temperature. The sintering of the green layer and the burn-in of the printed conductor preferably proceed in one and the same heating process.

In another preferred embodiment of the infrared emitter, the printed conductor is covered by an electrically insulating, gas-tight layer, such as a glaze layer, in place of or supplementing the cover layer made of opaque quartz glass. This layer shields the printed conductor electrically with respect to the outside and serves to protect the printed conductor from mechanical and corrosive stress.

The infrared emitter according to exemplary embodiments of the invention is also characterised, in particular, by the high spatial homogeneity of the emitted radiation. Accordingly, approximately equal radiation intensities are measured already at short distances from the planar emission surface. Accordingly, in a preferred embodiment of the panel infrared emitter, the substrate includes a planar emission surface that faces away from the printed conductor and emits the infrared radiation, whereby the infrared radiation generates an irradiation intensity at a distance of 10 mm from the emission surface, which—measured at ten measuring sites situated at a distance of 5 mm from each other—deviates by no more than +/−5% from a maximum value of the irradiation intensity at any of the measuring sites.

The measurement of the irradiation intensity is done by means of the method from the international standard IEC 62798 (2014).

Figure 1:
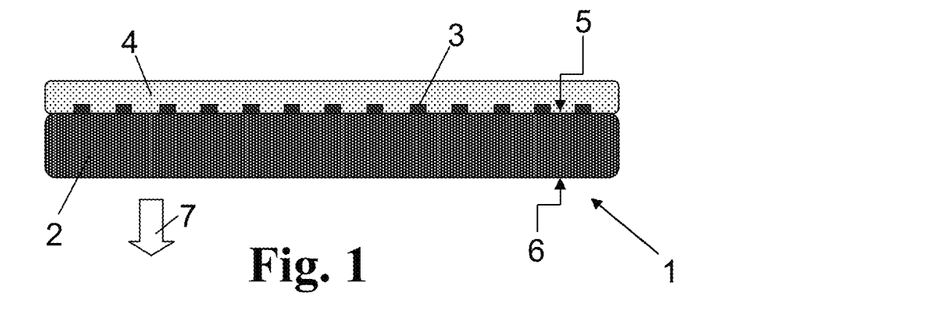
FIG. 1 is a schematic depiction and a side view of an infrared emitter having a reflector layer in accordance with an exemplary embodiment of the invention.

FIG. 1 shows a schematic depiction of a first embodiment of a multi-layered panel infrared emitter 1 according to the invention. This infrared emitter includes a plate-shaped substrate 2, a printed conductor 3, and a reflector layer 4.

The plate-shaped substrate 2 has a rectangular shape and a plate thickness of 2.5 mm. It consists of a composite material with a matrix made of quartz glass. The visual effect of the matrix is translucent to transparent. Upon microscopic inspection, it shows no open pores and at most closed pores with maximum mean dimensions of less than 10 µm. A phase of silicon in elemental form is homogeneously distributed in the matrix in the form of non-spherical areas. These account for a weight fraction of 5%. The maximum mean dimensions of the Si phase areas (median) are in the range of approximately 1 to 10 µm. The composite material is gas-tight, it has a density of 2.19 g/cm³ and it is stable on air up to a temperature of approximately 1200° C.

The embedded Si phase contributes not only to the overall opacity of the composite material, but also has an impact on the optical and thermal properties of the composite material. The composite material shows high absorption of heat radiation and high emissivity at high temperature.

At room temperature, the emissivity of the composite material for the substrate 2 is measured using an integrating sphere. This allows for measurement of the spectral hemispherical reflectance $R_{gh}$ and of the spectral hemispherical transmittance $T_{gh}$ from which the normal emissivity can be calculated. The emissivity at elevated temperature is measured in the wavelength range from 2 to 18 µm by means of an FTIR spectrometer (Bruker IFS 66v Fourier Transformation Infrared (FTIR)) to which a BBC sample chamber is coupled by means of an additional optical system, applying the above-mentioned BBC measuring principle. In this context, the sample chamber is provided with thermostatted lack body environments in the semi-spheres in front of and behind the sample holder, and with a beam exit opening with a detector. The sample is heated to a predetermined temperature in a separate furnace and, for the measurement, transferred into the beam path of the sample chamber with the black body environments set to the predetermined temperature. The intensity detected by the detector is composed of emission, reflection, and transmission portions, namely intensity emitted by the sample itself, intensity that is incident on the sample from the front hemisphere and is reflected by the sample, and intensity that is incident on the sample from the back hemisphere and is transmitted by the sample. 3 measurements can be performed to determine the individual parameters, i.e. the degrees of emission, reflection, and transmission.

The degree of emission measured on the composite material in the wavelength range of 2 to approximately 4 µm is a function of the temperature. The higher the temperature, the higher is the emission. At 600° C., the normal degree of emission in the wavelength range of 2 to 4 µm is above 0.6. At 1000° C., the normal degree of emission in the entire wavelength range of 2 to 8 µm is above 0.75.

The printed conductor 3 is generated from a platinum resistor paste on the top 5 of the substrate 2. Both ends have cables or clamps 46 (see FIG. 4) for the supply of electrical energy soldered to them. Printed conductor 3 shows a meandering profile (see FIG. 4) that covers a heating surface of the substrate 2 so tightly that an even distance of 2 mm remains between neighbouring sections of printed conductor. In the cross-section shown, the printed conductor 3 has a rectangular profile with a width of 1 mm and a thickness of 20 µm. Due to the low thickness, the fraction of material accounted for by the expensive printed conductor material in the infrared emitter is low compared to its efficiency. The printed conductor 3 is in direct contact with the top 5 of the substrate 2 such that maximal heat transmission into substrate 2 is attained. The opposite bottom side 6 serves for the use of the infrared emitter as an emission surface for heat radiation. The direction of the emission is indicated by direction arrow 7.

The reflector layer 4 consists of opaque quartz glass and has a mean layer thickness of approximately 1.7 mm. It is characterized by absence of cracks and a high density of approximately 2.15 g/cm$^3$ and is thermally stable at temperatures up to and above 1100° C. The reflective layer 4 covers the entire heating area of the substrate 2 and it covers the printed conductor 3 completely and thus shields it from ambient chemical or mechanical influences.

In as far as the same reference numbers as in FIG. 1 are used in the embodiments shown in other figures, these denote components and parts that are identical in design or equivalent as illustrated in more detail above by means of the description of the first embodiment of the infrared emitter according to the invention.

Figure 6:
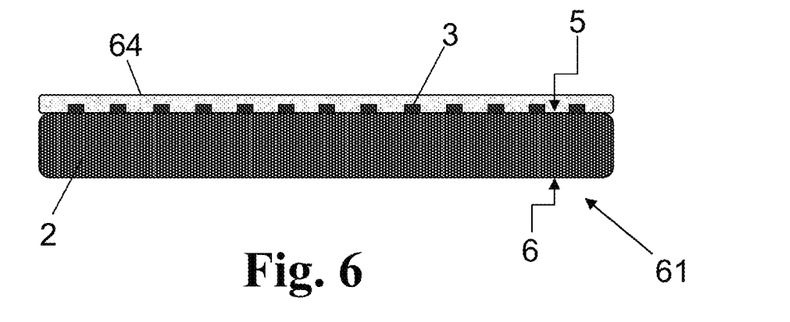
FIG. 6 is a side view of a tile-shaped infrared emitter having a printed conductor embedded into an electrically insulating and gas-tight glaze layer in accordance with an exemplary embodiment of the invention.

In the embodiment of the tile-shaped infrared emitter 61 shown in FIG. 6, a printed conductor 3 is situated on the top 5 of the substrate 2 that is opposite from the emission surface (the bottom side 6). The printed conductor is covered by means of an electrically insulating layer 64 in the form of a glaze. The insulating layer 64 shields the printed conductor 2 electrically with respect to the outside and serves to protect the printed conductor 2 from mechanical and corrosive stress. It consists of a glass-like material that is distributed evenly on the top 5 upon heating as a softened viscous glass phase, and effects gas-tight shielding. Due to the softening behaviour of the glass phase with comparably low softening temperature and corresponding capability of plastic deformation across a wide range of temperatures, compressive stresses between substrate 2 and insulating layer 64 arising from their different thermal expansion coefficients are largely prevented.

To produce the insulating layer 64, a screen-printing paste is applied appropriately to the top 5 of the substrate such that the printed conductor 3 is completely embedded therein. The screen-printing paste consists of a highly pure $SiO_2$ powder (20 to 80% by weight), and a solvent (20 to 50% by weight), and a binding agent (1 to 15% by weight), whereby the numbers given in parentheses specify preferred weight fractions of the total mass of the paste for the respective component. Hexanol, for example, is used as solvent, phthalate, for example, is used as plasticiser, and polyvinyl alcohol, for example, is used as the binding agent.

A screen-printing paste is produced from a 1:1 mixture (which fractions) of the powder-raw material mixture and distilled water including an added binding agent. A layer of the paste with a thickness of 100 µm is then printed onto the top of the substrate 2 such that the printed conductor 2 is fully embedded therein and this is sintered to form a gas-tight and insulating layer 64. However, the sintering of printed conductor 2 and insulating layer 64 can just as well proceed in a single work step.

Figure 2:
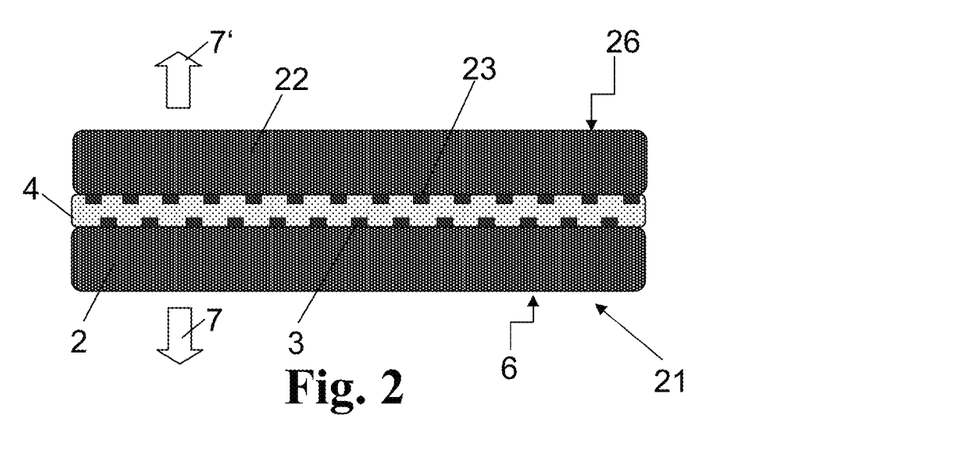
FIG. 2 is a schematic depiction of a multi-layered infrared emitter having a reflector layer as an intervening layer in accordance with an exemplary embodiment of the invention.

In the embodiment of the panel infrared emitter of FIG. 2, two substrate bodies 2, 22 that are essentially equal in construction are provided and have the reflector layer 4 and the printed conductors 3; 23 embedded therein in a sandwich-like manner. This embodiment of the panel infrared emitter is designed for bilateral emission of heat as it is provided with two emission surfaces (6; 26). The direction arrows 7, 7' indicate the emission directions.

Figure 3:
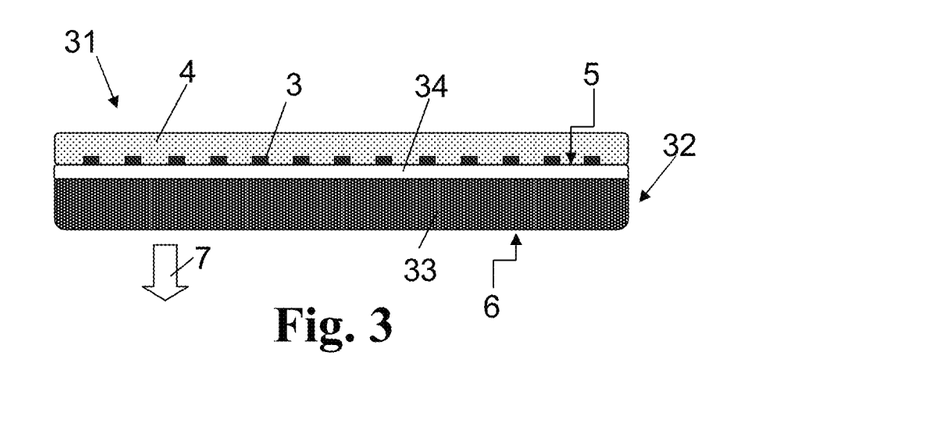
FIG. 3 is a side view of another multi-layered infrared emitter in accordance with an exemplary embodiment of the invention.

A multi-layered substrate 32 is used in the embodiment of the infrared emitter 31 of FIG. 3. The substrate consists of a base body 33 made of the composite material as illustrated by means of FIG. 1, and a thin cover layer 34 made of undoped quartz glass, which fully covers a surface of the base body 33. The cover layer 24 made of quartz glass has a thickness of 0.5 mm and forms the substrate top 35 to which the printed conductor 3 is applied. This embodiment is advantageous as compared to the embodiment of FIG. 1 in that the printed conductor 3 can be applied to the surface of the cover layer which is smoother than the composite material.

In another embodiment of the infrared emitter according to the invention, which is not drawn in the form of a figure, a multi-layered substrate is provided that consists of a base body made of the composite material as illustrated by means of FIG. 1, in which the emission side is fully configured with a thin cover layer made of undoped quartz glass. This embodiment is advantageous as compared to the embodiment of FIG. 1 in that the composite material is fully shielded from the surroundings about the goods to be irradiated such that a discharge of impurities from the composite material into the heating goods as well as corrosive attacks on the composite material from the surroundings are prevented.

Figure 4:
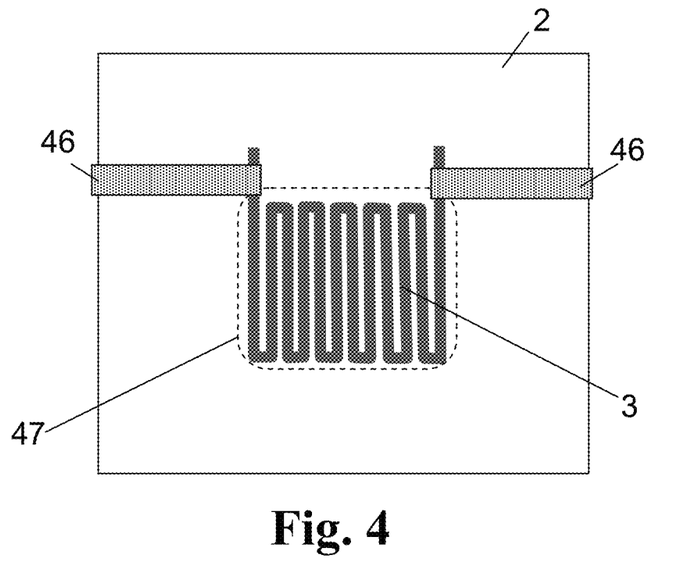
FIG. 4 is a top view schematic depiction of the tile-shaped infrared emitter of FIG. 1 looking into the upper side and configured with a meandering printed conductor.

FIG. 4 shows the top view onto the top 5 of the tile-shaped substrate 2 made of silicon-containing quartz glass. Both the meandering profile of the printed conductor 3 on the top of the substrate and the power supply terminals 36 can be seen in the figure. There is a comparably large distance of 2 mm between the sections of printed conductor. The electrical contacting takes place via the terminals 46 on two opposite sides in this exemplary embodiment. Obviously, contacting on just one side is feasible just as well.

Figure 5:
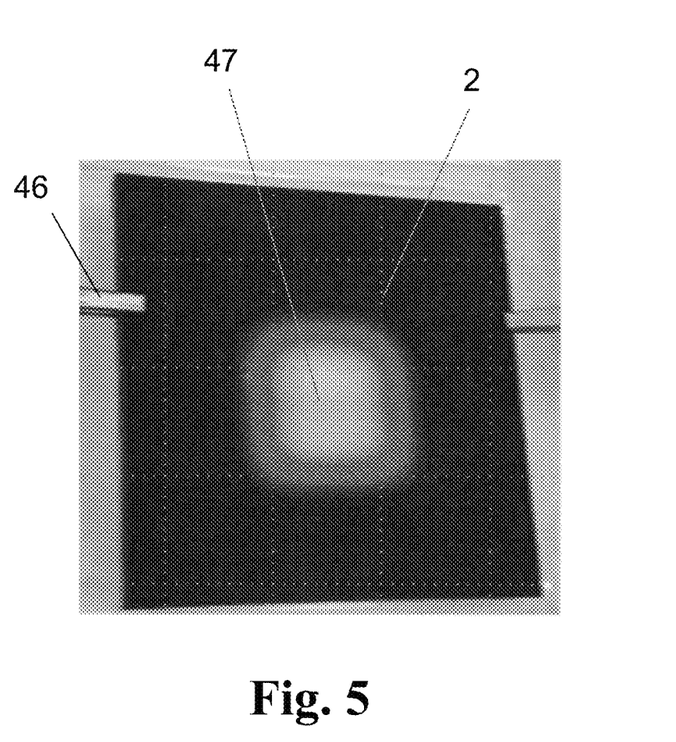
FIG. 5 is an optical image of a visually perceivable glowing of the infrared emitter in a top view onto the underside of the tile in accordance with an exemplary embodiment of the invention.

The occupation surface for printed conductor 3 defines the heating surface 47 of the substrate 2. Within the heating surface 47, a maximal temperature of approximately 1000° C. is established essentially evenly on the bottom side of the substrate, as is evident from the visually recognisable glow of the quartz glass substrate 2 of FIG. 5 being a homogeneous bright area.

A method for producing the panel infrared emitter 1 shall be illustrated in more detail below by way of an example.

Production of substrate 2: The production utilizes the slurry casting procedure described in WO 2015067688 A1. Amorphous quartz glass grains are purified in advance in a hot chlorination procedure making sure that the cristobalite content is below 1% by weight. Quartz glass grains with grain sizes in the range of 250 µm to 650 µm are wet milled with deionised water such that a homogeneous basic slurry with a solids content of 78% is formed.

Then the milling beads are removed from the basic slurry and silicon powder is added until a solids content of 83% by weight is reached. The silicon powder predominantly contains non-spherical powder particles with a narrow particle size distribution whose $D_{97}$ value is approximately 10 μm and whose fine fraction of particle sizes of less than 2 μm was removed in advance.

The slurry filled with the silicon powder is homogenised for another 12 hours. The silicon powder accounts for a weight fraction of the total solids content of 5%. The $SiO_2$ particles in the ready-homogenised slurry have a particle size distribution that is characterised by a $D_{50}$ value of approximately 8 μm and a $D_{90}$ value of approximately 40 μm.

The slurry is cast in a die of a commercial die-casting machine and dewatered using a porous plastic membrane to form a porous green body. The green body has the shape of a rectangular plate. To remove bound water, the green body is dried at approximately 90° C. for five days in an aerated furnace. After cooling, the porous blank thus obtained is processed mechanically to be close to the final dimension of the quartz glass plate to be produced, which has a plate thickness of 2.5 mm. For sintering, the blank is heated over the course of one hour to a heating temperature of 1390° C. in a sintering furnace in the presence of air and maintained at this temperature for 5 hours.

The quartz glass plate (2) thus obtained consists of a gas-tight composite material with a density of 2.1958 g/cm³, in which non-spherical regions of elemental Si phase that are separated from each other and whose size and morphology correspond essentially to those of the Si powder used in the process are homogeneously distributed in a matrix made of opaque quartz glass. The maximum mean dimensions (median) are in the range of approximately 1 to 10 μm. The visual effect of the matrix is translucent to transparent. Upon microscopic inspection, it shows no open pores and at most closed pores with maximum mean dimensions of less than 10 μm; the porosity calculated based on the density is 0.37%. The composite material is stable on air up to a temperature of approximately 1200° C.

Application of printed conductor 3 and reflector layer 4: The quartz glass plate (2) is being polished on the surface such that a mean surface roughness Ra of approximately 1 μm is established. The meander-shaped printed conductor 3 is applied to its polished top 5 by means of a screen-printing procedure. A commercial platinum-containing resistor paste is used for this purpose.

After the printed conductor 3 is dried, a layer of slurry is applied to the top 5 of the quartz glass plate (2). This slurry is obtained by modification of the basic $SiO_2$ slurry of the type described above (without added silicon powder) by admixing to the homogeneous stable basic slurry amorphous $SiO_2$ grains in the form of spherical particles with a grain size of about 5 μm until a solids content of 84% by weight is reached. This mixture is homogenised for 12 hours in a tumbling mill rotating at a rate of 25 rpm. The slurry thus obtained has a solids content of 84% and a density of approximately 2.0 g/cm³. The $SiO_2$ particles in the slurry obtained after milling of the quartz glass grains have a particle size distribution that is characterised by a $D_{50}$ value of approximately 8 μm and a $D_{90}$ value of approximately 40 μm.

Cleaned in advance in alcohol, the quartz glass plate (2) is immersed in the slurry for a few seconds. As a result, a homogeneous slurry layer with a thickness of approximately 2 mm is formed on the quartz glass plate (2). After wiping the bottom side 6, the slurry layer is dried initially at room temperature for approximately 5 hours and subsequently on air by means of an IR emitter. The dried slurry layer is free of cracks and has a mean thickness of a little less than 2 mm.

Subsequently, the dried printed conductor and the dried slurry layer are burned-in and/or sintered on air in a sintering furnace. The heating profile in this example includes a heating temperature of 1200° C. The holding time is two hours in the exemplary embodiment. Subsequently, the printed conductor is burnt-in and the slicker layer is opaque, but visually dense and largely free of bubbles.

The infrared emitter according to exemplary embodiments of the invention is characterised by a high degree of emission for heat radiation, effective utilization of the supplied power and flexibility in its geometric design. It can be used as a planar infrared emitter, for example, in the printing industry, in order to realise high process speeds (>100 m/s) at very high power density (>200 kW/m²) and small distances to the substrate (<5 mm). Another application is in the field of 3D printing, in which printed metallic powders are compacted due to the high area output and the emitter temperature of approximately 1000° C.

Figure 7:
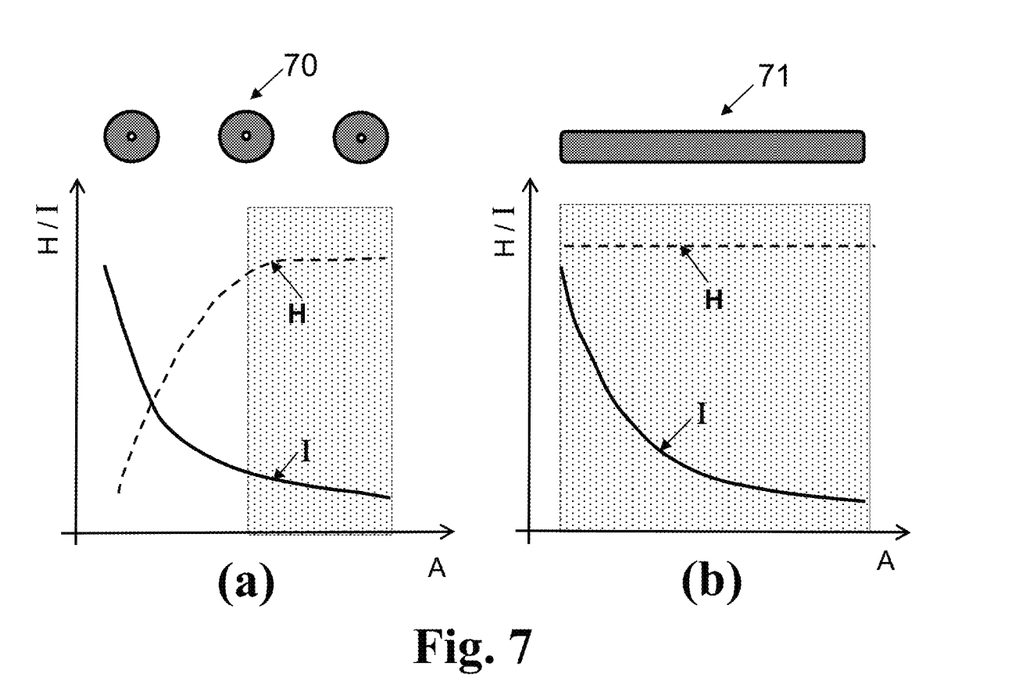
FIGS. 7(a) and 7(b) are diagrams illustrating, a comparison of homogeneity and intensity of radiation by a panel infrared emitter in accordance with an exemplary embodiment of the invention and a panel infrared emitter according to the prior art.

Diagrams (a) and (b) of FIG. 7 illustrate, schematically, the relationship between irradiation homogeneity and/or irradiation intensity and the distance between emitter and heating goods as well as pertinent differences between a panel infrared emitter composed of several individual emitters (diagram (A)) and the tile-shaped panel infrared emitter according to aspects of the invention (diagram (b)). The homogeneity "H" and/or the radiation intensity "I" impinging on the heating goods are plotted, in relative units, on the ordinate of diagrams (a) and (b) over the distance "A" (also in relative units) between emitter and heating goods. The panel emitter 70 in diagram (a) is represented by multiple carbon radiant heaters that are arranged next to each other and whose cladding tubes are indicated by three circles. The infrared emitter according to the exemplary embodiment of the invention is indicated in diagram (b) by a rectangular tile 71. The tile-shaped infrared emitter 71 and the arrangement 70 of the carbon emitters have the same electrical connected load in this context.

The profile of the homogeneity H over distance A is indicated by the dashed curve H and the profile of the intensity I is indicated by the continuous curve I. Accordingly, the irradiation intensity I increases with the distance A approximately to the same degree in the standard panel emitter 70 and in the panel infrared emitter 71 according to the invention, but the homogeneity of the irradiation is largely independent of the distance A in the panel infrared emitter 71 according to the invention, whereas it is low at short distance in the standard panel infrared emitter.

The grey-hatched area schematically defines a "working area", in which an acceptable irradiation homogeneity on the irradiated goods is evident. It is evident then that this homogeneity can be attained in the standard panel infrared emitter 70 by maintaining a certain distance, but that this is associated with a significant loss of irradiation intensity. In contrast, the infrared emitter is 71 according to the invention allows for sufficiently high homogeneity even at very low distances at which the intensity of the radiation is high as well. Accordingly, the infrared emitter 71 according to such exemplary embodiments of the invention features significantly improved efficiency as compared to the panel emitter 70 made of individual carbon emitters.

The spatial homogeneity of the emitted radiation is tested in accordance with IEC 62798 (2014). For this purpose, the panel infrared emitter is installed in a testing device and mounted on a movable table. The optical power is detected by means of a thermoelectric detector at a predetermined working distance of 10 mm from the emission surface of the infrared emitter. The irradiation intensity is determined at several measuring sites at steps of 5 mm. The radiation intensity is defined to be sufficiently homogeneous if it varies by no more than +/−5% from the measured maximum value at 10 measuring sites near the middle of the sample. This type of measurement is referred to as an "axial measurement" hereinafter.

Figure 8:
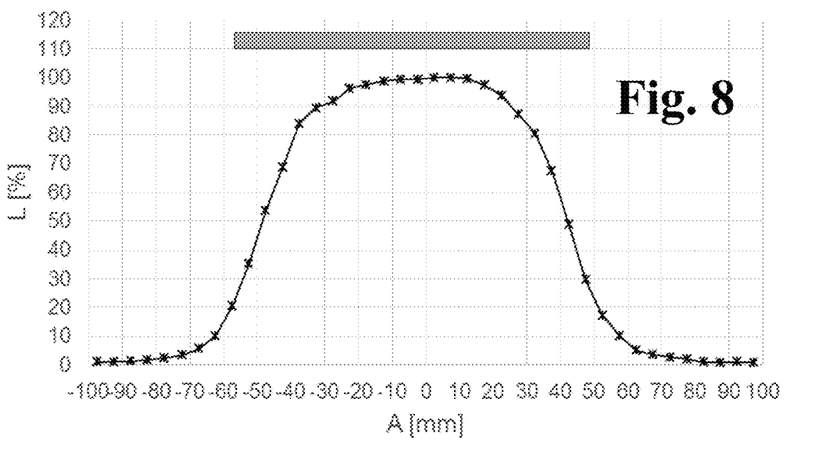
FIG. 8 is a diagram illustrating an irradiation profile of infrared radiation of a panel infrared emitter impinging on a measuring sample in accordance with an exemplary embodiment of the invention.
Figure 9:
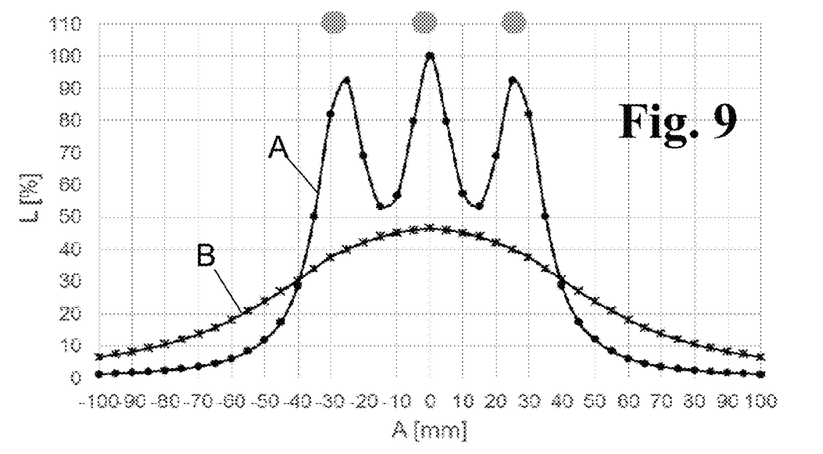
FIG. 9 is a diagram illustrating an irradiation profile of infrared radiation of a panel infrared emitter according to the prior art made up of individual carbon emitter lamp tubes impinging on a measuring sample.
Figure 10:
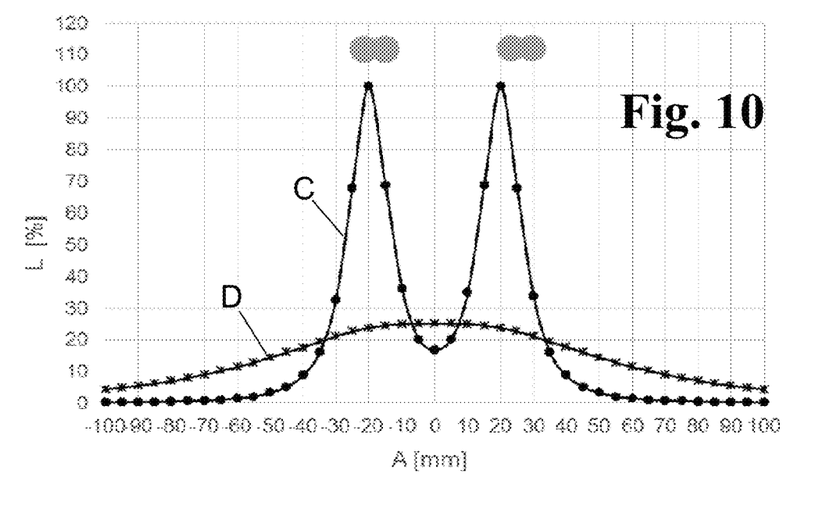
FIG. 10 is a diagram illustrating an irradiation profile of infrared radiation of a panel infrared emitter according to the prior art made up of individual twin tube emitters impinging on a measuring sample.

The diagrams of FIGS. 8 to 10 illustrate the result of axial measurements on different types of panel infrared emitters. In each case, a standardized optical power L (in %) is plotted on the y axis, and the lateral distance A (in mm) from a center line that extends through the origin of the axes and relates either to the lateral dimension of a panel emitter (FIG. 8) or to the lateral dimension of a spatial arrangement of individual emitters (FIG. 9, FIG. 10) is plotted on the x axis.

FIG. 8 shows the lateral profile of the optical power for the case of a panel infrared emitter according to exemplary aspects of the invention, such as, for example, the panel infrared emitter 71 of FIG. 7, measured at a working distance of 10 mm. The lateral profile is comparably homogeneous at near 100% over an extended area about the center line. This is evident since the optical power does not drop below 95% of the maximum value (100%) in a working area with more than 10 measuring points about the center line.

In comparison, FIG. 9 shows for the case of a panel infrared emitter including individual carbon emitters, such as the panel infrared emitter 70 of FIG. 7, that the profile of the optical power L is at the standard working distance of 10 mm (curve A) is inhomogeneous. A lateral profile of the optical power with acceptable homogeneity results only at a working distance of 40 mm (curve B). However, the optical power that can be attained at the surface of the heating goods is less than 50% of the maximum power.

A similar result is obtained in an axial measurement on a panel infrared emitter that is designed as a spatial arrangement of so-called twin tube emitters, as shown in FIG. 10. Commercial twin tube emitters are provided with channels that extend parallel to each other and are spatially separated from each other, for accommodation of heating filaments. As before, an inhomogeneous profile of the optical power L is evident at a working distance of 10 mm (curve C); and a lateral profile of the optical power with acceptable homogeneity results only at a working distance of 60 mm (curve D). However, the resulting optical power that can be attained at the surface of the heating goods is only less than 30% of the maximum power.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. An infrared emitter, comprising:
a substrate made of an electrically insulating material, the substrate including a surface that contacts a printed conductor made of a resistor material that is electrically conducting and generates heat when current flows through it, wherein the electrically insulating material includes an amorphous matrix component into which an additional component is embedded that absorbs in the spectral range of infrared radiation, and wherein at least a part of the surface is configured with a cover layer made of porous glass, whereby the printed conductor is embedded, at least in part, in the cover layer, wherein a type and an amount of the additional component are present such as to effect, in the electrically insulating material at a temperature of 600° C., an emissivity ε of at least 0.6 for wavelengths between 2 and 8 μm.

2. The infrared emitter according to claim 1 wherein the amorphous matrix component is quartz glass.

3. The infrared emitter according to claim 1, wherein a weight fraction of the additional component is in the range of 0.1 to 5%.

4. The infrared emitter according to claim 1, wherein the additional component is present as a separate additional component phase and comprises a non-spherical morphology with maximal mean dimensions of less than 20 μm, but preferably of more than 3 μm.

5. The infrared emitter according to claim 1, wherein the additional component contains a semiconducting material in elemental form.

6. The infrared emitter according to claim 1, wherein the electrically insulating material exhibits a closed porosity of less than 0.5% and has a specific density of at least 2.19 g/cm$^3$.

7. The infrared emitter according to claim 1, wherein the printed conductor is provided as a burnt-in cover film layer.

8. The infrared emitter according to claim 1, wherein the printed conductor is provided as a line pattern covering a surface of the substrate such that an intervening space of at least 1 mm remains between neighbouring sections of the printed conductor.

9. The infrared emitter according to claim 1, wherein the printed conductor is covered by an electrically insulating, gas-tight layer.

10. The infrared emitter according to claim 1, wherein the infrared emitter is designed as a panel infrared emitter, whereby the substrate comprises a planar emission surface that faces away from the printed conductor and emits infrared radiation, whereby the infrared radiation generates an irradiation intensity at a distance of 10 mm from the emission surface, which measured at ten measuring sites spaced 5 mm from each other deviates by no more than +/−10% from a maximum value of the irradiation intensity at any of the measuring sites.

11. The infrared emitter according to claim 1 wherein a type and an amount of the additional component are present such as to effect, in the electrically insulating material at a temperature of 1000° C., an emissivity c of at least 0.75 for wavelengths between 2 and 8 μm.

12. The infrared emitter according to claim 2 wherein the quartz glass has a chemical purity of at least 99.99% SiO$_2$ and a cristobalite content of at most 1%.

13. The infrared emitter according to claim 4 wherein the separate additional component phase comprises a non-spherical morphology with maximal mean dimensions of more than 3 μm and less than 20 μm.

14. The infrared emitter according to claim 5 wherein the additional component contains silicon in elemental form.

15. The infrared emitter according to claim 1 wherein the printed conductor is provided as a line pattern covering a surface of the substrate such that an intervening space of at least 2 mm remains between neighbouring sections of the printed conductor.

16. An infrared emitter, comprising:
a substrate made of an electrically insulating material, the substrate including a surface that contacts a printed conductor made of a resistor material that is electrically conducting and generates heat when current flows through it, wherein the electrically insulating material includes an amorphous matrix component into which an additional component is embedded that absorbs in the spectral range of infrared radiation, and wherein at least a part of the surface is configured with a cover layer made of porous glass, whereby the printed conductor is embedded, at least in part, in the cover layer, wherein a type and an amount of the additional component are present such as to effect, in the electrically insulating material at a temperature of 1000° C., an emissivity ε of at least 0.75 for wavelengths between 2 and 8 μm.

17. The infrared emitter according to claim 16, wherein a weight fraction of the additional component is in the range of 0.1 to 5%.

18. The infrared emitter according to claim 16, wherein the additional component contains a semiconducting material in elemental form.

19. The infrared emitter according to claim 16, wherein the infrared emitter is designed as a panel infrared emitter, whereby the substrate comprises a planar emission surface that faces away from the printed conductor and emits the infrared radiation, whereby the infrared radiation generates an irradiation intensity at a distance of 10 mm from the emission surface, which measured at ten measuring sites spaced 5 mm from each other deviates by no more than +/−10% from a maximum value of the irradiation intensity at any of the measuring sites.

20. The infrared emitter according to claim 1, wherein the amorphous matrix component is quartz glass and the additional component contains silicon in elemental form.

\* \* \* \* \*

UNITED STATES PATENT AND TRADEMARK OFFICE
CERTIFICATE OF CORRECTION

PATENT NO. : 10,785,830 B2
APPLICATION NO. : 15/775947
DATED : September 22, 2020
INVENTOR(S) : Gaab et al.

It is certified that error appears in the above-identified patent and that said Letters Patent is hereby corrected as shown below:

In the Claims

Claim 8, Column 14, Line 26, "neighbouring" should be neighboring;

Claim 11, Column 14, Line 44, "c" should be ε;

Claim 15, Column 14, Line 58, "neighbouring" should be neighboring;

Claim 20, Column 15, Line 26, "1" should be 16.

Signed and Sealed this
Twentieth Day of July, 2021

Drew Hirshfeld
*Performing the Functions and Duties of the
Under Secretary of Commerce for Intellectual Property and
Director of the United States Patent and Trademark Office*